United States Patent

[11] 3,582,226

| | | |
|---|---|---|
| [72] | Inventor | Norval E. Shurtliff<br>908 First Place, Springfield, Oreg. 97477 |
| [21] | Appl. No. | 788,419 |
| [22] | Filed | Jan. 2, 1969 |
| [45] | Patented | June 1, 1971 |

[54] UNIVERSALLY DAMPED TOOL HOLDER
15 Claims, 4 Drawing Figs.

[52] U.S. Cl. .................................................. 408/143,
82/36, 90/11
[51] Int. Cl. ........................................................ B23b 29/03
[50] Field of Search ............................................ 51/168;
77/58 B, 58.2; 90/11.1; 82/916, 36

[56] References Cited
UNITED STATES PATENTS

| | | | |
|---|---|---|---|
| 2,656,742 | 10/1953 | Poole ............................ | 77/58 |
| 2,960,189 | 11/1960 | Osburn ......................... | 77/58X |
| 3,164,041 | 1/1965 | Carlstedt ...................... | 77/58 |
| 3,172,308 | 3/1965 | Shurtliff ....................... | 77/56 |
| 3,207,009 | 9/1965 | Carlstedt ...................... | 77/58 |
| 3,230,833 | 1/1966 | Shurtliff ....................... | 90/11 |
| 3,447,402 | 6/1969 | Ray ............................... | 77/58 |

*Primary Examiner*—Gerald A. Dost
*Attorney*—Eugene D. Farley

ABSTRACT: A tool holder damped against vibrations having a wide range of frequencies comprises a tool support member provided with tool mounting means. The support member has a recess containing a segmental vibration damping member. The latter includes a plurality of nesting pieces. The meeting faces of the pieces are in frictional contact with each other. At least come of the pieces are spaced from the recess sidewall. Resilient means bear against the pieces, maintaining them wedged together in normally centered position.

Displacement of the tool holder, such as occurs during operation of a cutting or other tool mounted thereon, results in a compensating damping movement of one or more of the pieces comprising the segmental damping member. The individual pieces are contoured and dimensioned to make individual ones more easily displaced than others, thereby compensating for vibrations occurring over a wide range of frequencies. This prevents the rhythmic chatter-causing vibration of the assembly.

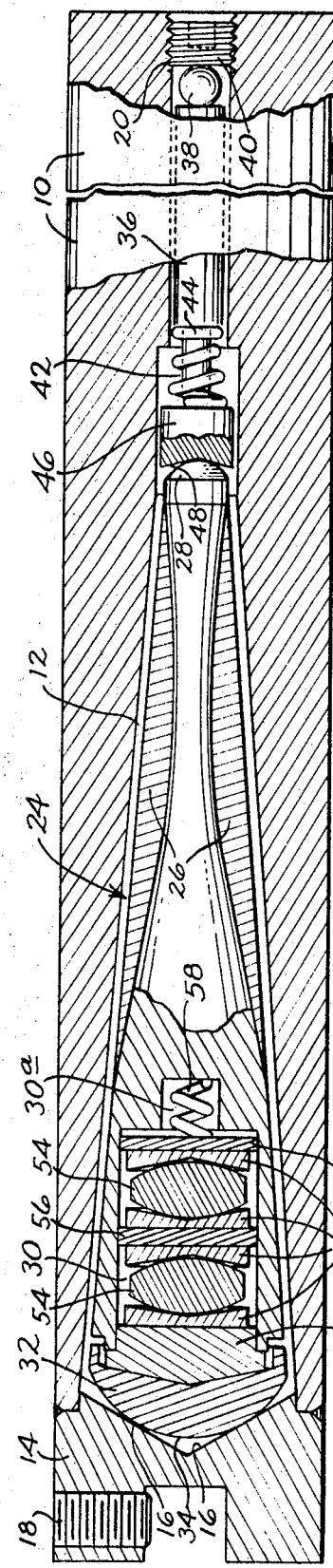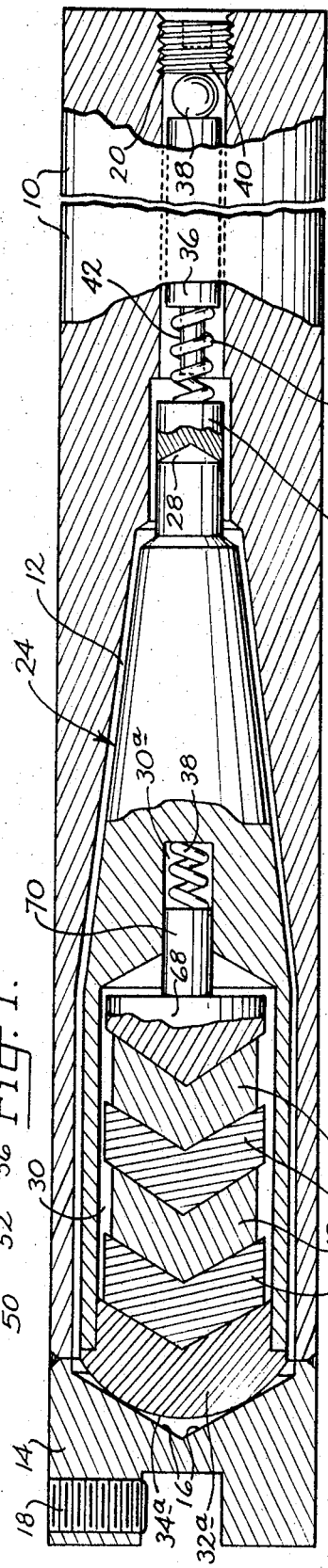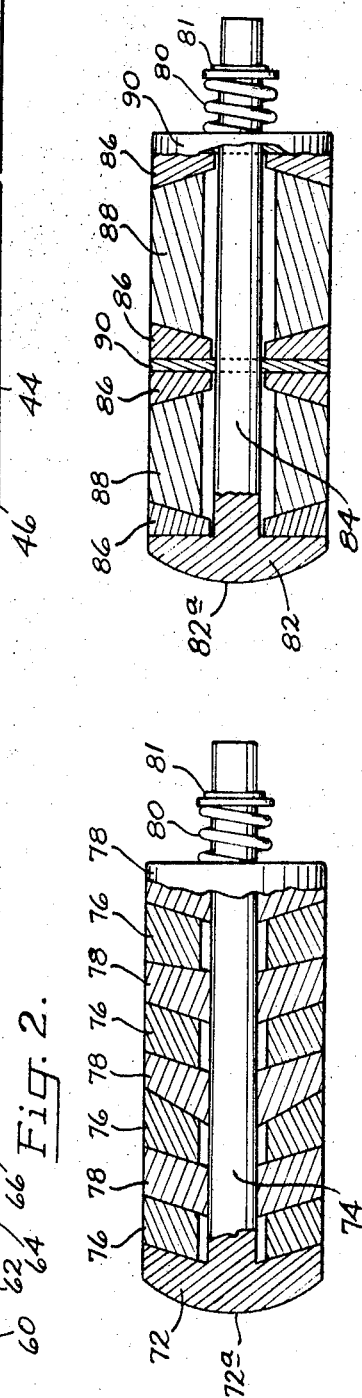
Norval E. Shurtliff
INVENTOR
BY Eugene D. Farley
Atty.

UNIVERSALLY DAMPED TOOL HOLDER

This invention relates to tool holders. It pertains particularly to boring bars damped against vibrations, and hence free from chatter.

Although the invention is described with particular reference to boring bars, it also is applicable to holders for various tools employed in milling machines, boring machines, grinding machines, turret lathes, engine lathes and any other equipment where a cutting or other tool and the work are rotated relative to each other.

In Shurtliff U.S. Pat. No. 3,230,833, there is described a tool holder having associated vibration damping means. The means described is remarkably efficient at high speeds and under heavy load. However, in the use of boring bars and related apparatus, a problem is caused by the fact that a broad spectrum of vibration frequencies is present and a bar so designed as to be free from vibration and chatter under heavy loads may not necessarily be free from these difficulties when operating under light load, as for example, in finishing off the work.

It accordingly is the general object of the present invention to provide a tool holder which is universally damped against vibrations occurring over a wide range of frequencies.

Still a further object of the present invention is the provision of a tool holder having a basic design which may be modified as required to damp the vibrations occurring in particular operations.

Still another object of the present invention is the provision of a tool holder which is applicable on a wide variety of cutting and other machines, which is simple in its construction, which is easily manufactured, and which possesses long service life.

Basically considered, the presently described tool holder providing the foregoing and other advantages comprises a tool support provided with tool mounting means. The support has a recess containing a segmental vibration damping member. The latter includes a plurality of nesting pieces stacked longitudinally of the recess and centrally thereof.

The meeting faces of the pieces are in frictional contact with each other. At least some of the pieces are spaced from the recess sidewall. Resilient means bear against the pieces, maintaining them wedged together in normally centered position.

The pieces are arranged in such a manner that vibration of the tool support results in a compensating damping displacement of one or more of the pieces comprising the segmental damping member. Since the pieces are contoured and dimensioned to make individual ones more easily displaced than others, vibrations are damped over a wide range of frequencies. This prevents the rhythmic, chatter-causing vibration of the assembly.

In the drawings:

FIG. 1 is a foreshortened view, largely in longitudinal section, of the herein described tool holder in one of its embodiments;

FIG. 2 is a view similar to FIG. 1 illustrating the tool holder of the invention in a second embodiment; and FIGS. 3 and 4 are detail, longitudinal, sectional views illustrating the tool holder of the invention in third and fourth embodiments respectively.

Although adapted to use per se, the vibration-damping element of the present invention is particularly well suited for application in cooperation with that disclosed in Shurtliff U.S. Pat. No. 3,230,833, aforesaid.

In such cooperative use, the damping element of the tool holder of the patent compensates efficiently for the vibration and chattering occurring under heavy work loads; that of the tool holder described herein, for the vibration and chatter occurring under lighter work loads. Thus the entire spectrum of vibration frequencies may be covered, with the result that there is provided a working tool which is free of vibration and chatter under all working conditions.

The tool holder of FIG. 1 includes an elongated hollow support bar 10. The bar has a central longitudinally extending bore 12 which may be or may not be inwardly tapered as shown in the drawings.

The inner end of bore 12, i.e. that adjacent the tool holder, is provided with a cap 14 secured across the bore of the bar by welding or other suitable means. The inner surface of cap 14 has a tapered end wall formed by abutment surfaces 16. These are outwardly divergent from the longitudinal axis of the bar at an angle of, for example, from 28—85°.

Cap 14 is provided with screw means 18 for mounting a selected cutting tool, not illustrated.

The open inner or shank end of bar 10 has an internally threaded segment 20. The bore 12 of the bar receives a stabilizing or damping rod, indicated generally at 24, the function of which is to damp any vibrational movement which may be induced in the holder during the cutting operation.

Rod 24 is dimensioned so that when it is centered in bore 12 it is spaced laterally from the sidewalls of the bore by a distance of, for example, from one sixty-fourth inch to one-fourth inch, preferably one thirty-second inch. Also, the rod is somewhat shorter than the longitudinal dimension of the bore. It thus is possible for the rod to move both laterally and longitudinally with respect to the bar in which it is housed.

Although the exterior configuration of stabilizing rod 24 may be varied, in the FIG. 1 form of the invention it is inwardly tapered to conform to the inwardly tapered configuration of the bore 12 of support bar 10.

The shank end of the stabilizing rod is of restricted cross section and supports preferably an armor of lead or other heavy material which may be tinned to the surface of the rod. The shank end of the rod also is provided with a terminal convexly arcuate bearing member 28.

The reach end of stabilizing rod 24 has a longitudinal recess or bore 30 having an inner extension 30a. It is closed off with a removable cap 32.

The exterior surface 34 of cap 32 is convexly arcuate or beveled to provide an end surface which abuts against abutment surfaces 16 of support bar 10. To secure the desired property of mass damping, the angle of abutment surfaces 16 of the support bar and end surface 32 of the stabilizing rod must be divergent from each other.

As a consequence, there are provided meeting bearing surfaces between the abutment surfaces of the support bar and the stabilizing rod end which are divergent from the longitudinal axis of the holder and also from each other, the degree of divergence of the bearing surfaces of the bar being greater than the degree of divergence of the bearing surface of the stabilizing rod. This relationship makes possible both lateral and longitudinal movement of the stabilizing rod and imparts to the assembly uniquely massive damping properties.

To originate this effect, the shank portion of bore 12 houses a spring rod 36. One end of the spring rod bears against a ball bearing 38 retained by means of an Allen head plug 40 screwed into threaded section 20 of the bore.

The other end of spring rod 36 is formed with an extension 42 which penetrates a coil spring 44. The latter bears against one end of an abutment member 46 having a concavely beveled terminal portion 48. This seats the bearing surfaces 28 of the shank end of the stabilizing rod.

The stabilizing rod thus is centered radially in part by tapered abutment elements 16, 34 at one end, and the corresponding elements 28, 46 at the other end. After any displacement it is returned to its centered equilibrium position by the action of spring 42, the force of which may be adjusted by adjustment of threaded plug 40.

The vibration-damping above described overcomes or damps vibrations caused under heavy load. Cooperating with it is a secondary assembly which damps vibrations of a lesser frequency, for example, those set up when the apparatus is employed in making finishing cuts.

The latter vibration-damping assembly is housed in the longitudinal bore or recess 30 in the reach end of the stabilizing rod. The assembly may be variously constituted as determined by various applications. However, by employing a flexible variation of inertia damping, friction damping, and viscous damping any desired range of the lesser vibration frequencies effectively may be overcome.

Thus in the form of the invention illustrated in FIG. 1 the secondary vibration damping member comprises a plurality of stacked nested pieces having their meeting faces in frictional contact with each other. The arrangement is such that the longitudinal axis of the stack is substantially normal to the direction of vibrational movement of the support, as well as to the planes of the pieces.

The first of the damping pieces is a terminal piece 50 having a convexly beveled outer surface. It centers itself in the mating, concavely beveled inner surface of cap 32.

The balance of the assembly is comprised of two pairs of pieces 52 having flat surfaces on one side and concavely beveled surfaces on the other; two pieces 54 having convexly beveled arcuate opposite side faces, each piece 54 being seated in the concavely beveled faces of pieces 52; and a pair of dividing pieces 56 having opposite side faces, which are flat. All of these pieces preferably are made from babbit metal, lead alloys, or other heavy materials.

It is to be noted that the relative widths of tapered damping pieces 52, 54 and 56 are varied to suit particular damping needs. The width of the pieces determines the magnitude of their spacing from sidewall recess 30. The magnitude of the spacing, in turn, determines the magnitude of the inertia drive which opposes the tendency of the bar to vibrate. Pieces 56, on the other hand, have a close sliding fit within recess 30. They act as spacers and in addition provide flat friction surfaces for the creation of the friction necessary for friction damping.

A spring 58 is received in recess extension 30a and bears against the assembly of vibration-damping pieces, centering them and providing a pressure which causes them to resist displacement in a lateral direction.

In addition, recess 30 may be partly filled with mercury or other heavy liquid.

The elements of the assembly thus damp effectively the vibration of the bar over a wide range of frequencies. Minor vibrations are overcome by slippage of the frictionally engaging flat surfaces of pieces 50, 52, 56. Intermediate vibrations are overcome by the action of inertia dampers 52, 54 which work against spring 58. The magnitude of their effect is determined by such factors as their predetermined bevel, their predetermined mass, their predetermined width, which provides varying degrees of amplitude, and the force of spring 58.

Massive vibrations are counteracted by the action of stabilizing rod 24 acting as a unit in its bearing mountings between divergent surfaces 16, 34 at one end and divergent surfaces 28, 48 at the other end, in the manner explained in Shurtliff U.S. Pat. No. 3,172,308.

All of the tapered pieces have sufficient clearance with respect to the bore of the recess so that they will at no time be able to strike it. They are held against each other and the whole assembly pressed against the tapered abutment of the recess by spring pressure. As vibration is encountered, the tapered pieces slip against each other to the limits of their clearance. At the same time they are displaced lengthwise. The whole assembly slides and is displaced by moving against the tapered abutment of the recess, breaking up and stopping the vibrations.

These factors act together to counteract the tendency of the bar to set up a rhythmic chatter at the usually encountered frequencies of vibration.

The form of the tool holder illustrated in FIG. 2 is similar to that illustrated in FIG. 1, with the exception that it has a secondary vibration-damping unit of unique construction, suitable for many purposes.

In this construction, stabilizing rod 24 and the internal bore of recess 30 are differently contoured to accommodate the new damping assembly.

The latter comprises a cap piece 32a which caps over recess 30. The cap piece has an arcuate outer surface 34a which engages beveled surfaces 16 of endpiece 14. It has a concavely beveled inner surface which receives and centers a nested stack of tapered discs 60, 62, 64, 66. All of these are provided with angular matching tapered surfaces so that they nest in the manner indicated in FIG. 2. The degree of angularity may be varied, as may the widths of the pieces.

A retainer 68 having an extension 70 supports and locates the inner end of the assembly of pieces. It has a beveled outer surface which seats in the matching beveled surface of piece 66. It has an extension 70 slidably received in recess 30a and bearing against spring 58.

In the operation of the FIG. 2 form of the tool holder, massive vibrations are overcome by operation of stabilizing rod 24 in the manner above described. Smaller and intermediate vibrations are overcome by the operation of tapered discs 60, 62, 64, 66 which are displaced differentially by the vibration, to a degree determined by their mass, their spacing from the sidewalls of recess 30, and their degree of angularity. In this manner the entire spectrum of vibration frequencies is compensated.

The FIG. 3 form of the invention illustrates still another form of secondary damper which may be inserted in recess 30 of FIG. 2. It also employs a combination of friction damping, inertia damping and, if desired, viscous damping to achieve the desired purpose.

To this end there is provided an endpiece 72 having a convexly arcuate outer surface 72a, corresponding to elements 32a, 34a, respectively, of the device of FIG. 2.

However, endpiece 72 is formed integrally with an elongated stem 74. This is of sufficient length to extend completely through recess 30 and into recess extension 30a.

Mounted on stem 74 are a plurality of damping pieces in the form of tapered discs having central perforations and angularly beveled surfaces. All of the discs are spaced slightly from the sidewall of recess 30. However, selected ones of the discs also are spaced slightly from stem 74. Others of the discs 78 are in sliding contact with the stem. A terminal retainer 78 has a central perforation which engages stem 74 in a sliding fit.

A coil spring 80 is compressed between retainer 78 and a snapring 81 mounted on the end of the stem. Coil spring 58, not illustrated in FIG. 3, but seated in recess 30a, bears against the end of the stem in the manner above described.

The angles between adjacent pairs of pieces 76, 78 may be varied, as may be the spacing of pieces 76 from stem 74. Accordingly in the operation of the device various degrees of force are required to displace various ones of the pieces. In this manner a range of vibrational frequencies is counteracted.

Like the embodiment of FIG. 3, the embodiment of FIG. 4 is designed for use in a tool holder such as is illustrated in FIG. 2. Also like FIG. 3, it is designed to be interchangeable with the secondary damping unit of FIG. 2.

In the FIG. 4 form of the invention, the secondary vibration damper comprises an endpiece 82 having an exterior, convexly arcuate surface 82a adapted to abut against abutment surfaces 16 of the outer case.

Integral with the endpiece is a stem 84 of sufficient length to span recess 30 and extend into recess extension 30a. A plurality of vibration damping pieces are mounted on the stem. These consist of three principal categories.

The first of these categories comprise discs 86. These are tapered on one side and squared on the other.

The second category comprises cylinders 88. These are tapered on both sides.

The third category comprises discs 90. These are squared on both sides.

Elements 86, 88, 90 all are of sufficient width so that they are spaced slightly from the sidewall of recess 30. However, the central perforations which receive stem 84 are various dimensioned. Thus in the illustrated form of the invention the openings through cylinders 88 are of larger diameter than the openings through discs 86. Both of these openings are sufficiently large to enable lateral displacement of the respective pieces.

The opening through flat discs 90, however, is merely sufficient to afford a sliding fit with stem 84.

In addition, the amount of taper of pieces 86, 88 may be varied.

Thus once again the means for control of vibration of a wide range of frequencies is afforded. Slippage of the flat surfaces of pieces 86 against the companion flat surfaces which they engage frictionally compensates for light vibrations. Displacement of pieces 86, 88 relative to each other, against the pressure of spring 80, overcomes vibrations of greater force.

It thus will be seen that by the present invention I have provided a tool holder damped against a broad spectrum of vibrations induced during use of the holder. This in turn at least reduces substantially, and usually eliminates entirely, the disastrous chattering which normally interferes seriously with the use of the tool and limits production accordingly. These desired results are obtained furthermore, by a relatively simple modifications of the holder which does not add greatly to its cost and which does not interfere with its usual application.

Having thus described my invention in preferred embodiments, I claim as new and desired to protect by letters patent:

1. A tool holder damped against vibration over a wide range of vibration frequencies, comprising:
   a. a tool support member,
   b. tool mounting means on the support member for mounting a tool thereon,
   c. the support member having a recess adjacent the tool mounting means,
   d. within the recess a segmental, vibration-damping member comprising a stack of nested weighted pieces.
   e. the meeting faces of the pieces being in frictional contact with each other, the adjacent pieces having mating convex and concave contours of different angles,
   f. the longitudinal axis of the stack being substantially normal to the direction of vibrational movement of the support member and to the planes of the pieces,
   g. at least some of the pieces being spaced laterally from the recess sidewall,
   h. and resilient means bearing against the pieces in the longitudinal direction of the stack and maintaining the pieces in a normally centered position with respect to each other.

2. A tool holder damped against vibration over a wide range of vibration frequencies, comprising:
   a. a tool support member,
   b. tool mounting means on the support member for mounting a tool thereon,
   c. the support member having a recess adjacent the tool mounting means,
   d. within the recess a segmental, vibration-damping member comprising a stack of nested weighted pieces,
   e. the meeting faces of the pieces being in frictional contact with each other, the angles which the pairs of meeting surfaces of the pieces assume with respect to the longitudinal axis of the vibration damping member being different from each other,
   f. the longitudinal axis of the stack being substantially normal to the direction of vibrational movement of the support member and to the planes of the pieces,
   g. at least some of the pieces being spaced laterally from the recess sidewall,
   h. and resilient means bearing against the pieces in the longitudinal direction of the stack and maintaining the pieces in a normally centered position with respect to each other.

3. A tool holder damped against vibration over a wide range of vibration frequencies, comprising:
   a. a tool support member,
   b. tool mounting means on the support member for mounting a tool thereon,
   c. the support member having a recess adjacent the tool mounting means,
   d. within the recess a segmental, vibration-damping member comprising a stack of nested weighted pieces,
   e. the meeting faces of the pieces being in frictional contact with each other, at least one of the pieces having convexly arcuate opposite sidewalls and adjacent pieces having concavely angular sidewalls dimensioned to receive the said one of the pieces in nesting relation,
   f. the longitudinal axis of the stack being substantially normal to the direction of vibrational movement of the support member and to the planes of the pieces,
   g. at least some of the pieces being spaced laterally from the recess sidewall,
   h. and resilient means bearing against the pieces in the longitudinal direction of the stack and maintaining the pieces in a normally centered position with respect to each other.

4. The tool holder of claim 3 wherein at least one of the pieces has flat opposite side surfaces and is in sliding contact with the recess sidewall.

5. A tool holder damped against vibration over a wide range of vibration frequencies, comprising:
   a. a tool support member,
   b. tool mounting means on the support member for mounting a tool thereon,
   c. the support member having a recess adjacent the tool mounting means,
   d. within the recess a segmental, vibration-damping member comprising a stack of nested weighted pieces,
   e. the meeting faces of the pieces being in frictional contact with each other, all of the pieces having angularly beveled surfaces providing the meeting surfaces of the opposite sides,
   f. the longitudinal axis of the stack being substantially normal to the direction of vibrational movement of the support member and to the planes of the pieces,
   g. at least some the pieces being spaced laterally from the recess sidewall,
   h. and resilient means bearing against the pieces in the longitudinal direction of the stack and maintaining the pieces in a normally centered position with respect to each other.

6. A tool holder damped against vibration over a wide range of vibration frequencies, comprising:
   a. a tool support means,
   b. tool mounting means on the support member for mounting a tool thereon,
   c. the support member having a recess adjacent the tool mounting means,
   d. within the recess a segmental, vibration-damping member comprising a stack of nested weighted pieces,
   e. the meeting faces of the pieces being in frictional contact with each other,
   f. the longitudinal axis of the stack being substantially normal to the direction of vibrational movement of the support member and to the planes of the pieces,
   g. at least some of the pieces being spaced laterally from the recess sidewall,
   h. and resilient means bearing against the pieces in the longitudinal direction of the stack and maintaining the pieces in a normally centered position with respect to each other,
   i. the pieces being centrally perforated and the assembly including a rod penetrating the perforations longitudinally of the stack and centering the pieces, alternate ones of the pieces being in sliding contact with the rod and alternate ones being spaced therefrom when the pieces are in their equilibrium stacked condition.

7. A tool holder damped against vibration over a wide range of vibration frequencies, comprising:
   a. a tool support member,
   b. tool mounting means on the support member for mounting a tool thereon,
   c. the support member having a recess adjacent the tool mounting means,
   d. within the recess a segmental, vibration-damping member comprising a stack of nested weighted pieces,
   e. the meeting faces of the pieces being in frictional contact with each other,
   f. the longitudinal axis of the stack being substantially normal to the direction of vibrational movement of the support member and to the planes of the pieces, g. at least some of the pieces being spaced laterally from the recess sidewall, h. resilient means bearing against the pieces in the longitudinal direction of the stack and maintaining the pieces in a normally centered position with respect to each other, and i. a cap member interposed between the stack of pieces and the tool mounting means and bearing against the latter, the bearing surfaces of the cap member and tool mounting means diverging with reference to each other and to the longitudinal axis of the tool support member, the degree of divergence of the bearing surface of the tool mounting means with reference to the longitudinal axis of the support member being greater than the degree of divergence of the bearing surface of the cap member with respect thereto.

8. A tool holder comprising:

a. a hollow support member, b. tool mounting means on the support member for mounting a cutting tool thereon, c. a stabilizing rod mounted in the support member substantially coaxial therewith and laterally spaced therefrom, d. abutment means on the support member for longitudinal abutment by one end of the stabilizing rod, e. the abutment means and the stabilizing rod having meeting, bearing surfaces which are divergent with reference to each other and to the longitudinal axis of the support member, f. the degree of divergence of the bearing surface of the abutment means with reference to the longitudinal axis of the support member being greater than the degree of divergence of the bearing surface of the stabilizing rod end with respect thereto, g. and bearing surface of the abutment means thereby providing an inclined plane adapted to translate lateral displacement of the support member into longitudinal displacement of the stabilizing rod, h. resilient compression means mounted on the support member and positioned to oppose longitudinal displacement of the stabilizing rod, returning the rod toward an equilibrium position after each longitudinal displacement thereof, i. the stabilizing rod having a recess in the end adjacent the tool mounting means, j. within the recess a segmental secondary vibration-damping member comprising a stack of nested weighted pieces arranged longitudinally in the recess centrally thereof, their meeting faces being in frictional contact with each other, k. the longitudinal axis of the stack being substantially normal to the direction of vibrational movement of the support member and to the planes of the pieces, l. at least some of the pieces being spaced laterally from the recess sidewall, m. and resilient means bearing against the pieces in the longitudinal direction of the stack and maintaining the pieces in a normally centered position with respect to each other.

9. The tool holder of claim 8 wherein the adjacent pieces have mating convex and concave contours of different angles.

10. The tool holder of claim 8 wherein the angles which the pairs of meeting surfaces of the pieces assume with respect to the longitudinal axis of the vibration damping member are different from each other.

11. The tool holder of claim 8 wherein at least one of the pieces has convexly arcuate opposite sidewalls and wherein adjacent pieces have concavely angular sidewalls dimensioned to receive the said one of the pieces in nesting relation.

12. The tool holder of claim 11 wherein at least one of the pieces has flat opposite side surfaces and is in sliding contact with the recess sidewall.

13. The tool holder of claim 8 wherein all of the pieces have angularly beveled surfaces providing the meeting surfaces of the opposite sides.

14. The tool holder of claim 8 wherein the pieces are centrally perforated and wherein the assembly includes a rod penetrating the perforations longitudinally of the stack and centering the pieces, alternate ones of the pieces being in sliding contact with the rod and alternate ones being spaced therefrom when the pieces are in their equilibrium stacked condition.

15. The tool holder of claim 8 including a cap member on the stabilizing rod interposed between the stack of pieces and abutment means on the support member and providing the bearing surface on the stabilizing rod engaging the bearing surface of the abutment means.